US012292980B2

(12) United States Patent
Sivaramakrishnan et al.

(10) Patent No.: US 12,292,980 B2
(45) Date of Patent: May 6, 2025

(54) SYSTEM AND METHOD FOR PERFORMING DYNAMIC EXPOSURE ANALYSIS BASED ON QUANTUM SIMULATIONS (71) Applicant: BANK OF AMERICA CORPORATION, Charlotte, NC (US)

(72) Inventors: Ramya Sivaramakrishnan, Chennai (IN); Bellamkonda Sunil Kumar, Telangana (IN); Vijetha Shetty, Mumbai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 413 days.

(21) Appl. No.: 17/350,940

(22) Filed: Jun. 17, 2021

(65) Prior Publication Data
US 2022/0405396 A1 Dec. 22, 2022

(51) Int. Cl.
G06F 21/00 (2013.01)
G06F 16/215 (2019.01)
G06F 21/57 (2013.01)
G06N 10/00 (2022.01)
G06F 7/58 (2006.01)
G06N 20/00 (2019.01)

(52) U.S. Cl.
CPC .......... *G06F 21/577* (2013.01); *G06F 16/215* (2019.01); *G06N 10/00* (2019.01); *G06F 7/58* (2013.01); *G06F 2221/034* (2013.01); *G06N 20/00* (2019.01)

(58) Field of Classification Search
CPC ........ G06F 21/577; G06F 16/215; G06F 7/58; G06F 2221/034; G06N 10/00; G06N 20/00; G06N 10/60; G06N 10/80; G06Q 10/0635
See application file for complete search history.

(56) References Cited

U.S. PATENT DOCUMENTS 7,135,701 B2  11/2006  Amin et al.
7,639,035 B2  12/2009  Berkley
7,898,282 B2  3/2011  Harris et al.
(Continued)

FOREIGN PATENT DOCUMENTS

WO    2011015510 A1    2/2011

*Primary Examiner* — Eleni A Shiferaw
*Assistant Examiner* — Hassan A Hussein
(74) *Attorney, Agent, or Firm* — Moore & Van Allen PLLC; Anoohya Yarlagadda (57) ABSTRACT A system for performing dynamic exposure analysis typically includes a classical computer apparatus and a quantum optimizer in communication with the classical computer apparatus. The classical computer apparatus is configured for gathering data from one or more data sources, processing the gathered data, via an artificial intelligence engine, to determine a change to an exposure rating, converting the gathered data into at least one matrix, converting the at least one matrix to at least one Qubit sequence, and transmitting the at least one Qubit sequence to a quantum optimizer. The quantum optimizer upon receiving the at least Qubit sequence, generates at least one random number based on one or more parameters stored in a configuration repository, computes the at least one Qubit sequence and the at least one random number to generate a real-time exposure rating, and transmits the real-time exposure rating to exposure analysis application.

20 Claims, 7 Drawing Sheets (56) References Cited

U.S. PATENT DOCUMENTS

| | | | |
|---|---|---|---|
| 9,964,853 B2 | 5/2018 | Vanoppen et al. | |
| 10,284,496 B2 | 5/2019 | Castinado et al. | |
| 10,440,052 B2 | 10/2019 | Lee et al. | |
| 10,454,892 B2 | 10/2019 | Kurian | |
| 11,245,519 B1* | 2/2022 | Stapleton, Jr. | H04L 9/0855 |
| 11,386,487 B2 | 7/2022 | Sinharoy | |
| 11,533,175 B1* | 12/2022 | Rao | G06N 20/00 |
| 2007/0076884 A1 | 4/2007 | Wellbrock et al. | |
| 2011/0317836 A1 | 12/2011 | Yeh et al. | |
| 2017/0323206 A1 | 11/2017 | Alipour Khayer et al. | |
| 2018/0260732 A1* | 9/2018 | Bloom | G06N 10/70 |
| 2020/0127821 A1* | 4/2020 | Dolev | H04L 9/0861 |
| 2022/0067468 A1* | 3/2022 | Smith | G06K 7/1434 |
| 2022/0216982 A1* | 7/2022 | McCarty | G06N 10/60 |
| 2022/0329417 A1* | 10/2022 | Farinholt | H04L 9/0858 |
| 2023/0051447 A1 | 2/2023 | Zhang et al. | |
| 2023/0211430 A1* | 7/2023 | Yamaoka | G05B 19/406 |
| | | | 219/69.12 |
| 2023/0229952 A1* | 7/2023 | Pakkiam | G06N 10/70 |
| | | | 716/100 |

\* cited by examiner

SYSTEM AND METHOD FOR PERFORMING DYNAMIC EXPOSURE ANALYSIS BASED ON QUANTUM SIMULATIONS

FIELD OF THE INVENTION

The present invention relates to utilizing a quantum optimizer to dynamically perform exposure analysis.

BACKGROUND

It is often difficult to keep one or more resources of an entity secure. As such, a need exists for an improved way of performing dynamic exposure analysis.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention address the above needs and/or achieve other advantages by providing apparatuses (e.g., a system, computer program product and/or other devices) and methods for performing dynamic exposure analysis based on quantum simulations.

In one aspect, the present invention embraces a computerized system, and an associated method and computer program product for performing dynamic exposure analysis based on quantum simulations. The system includes a processor, a memory, and a network communication device. In one embodiment, the system comprises a classical computer apparatus comprising: a processor; a memory; and an exposure analysis application that is stored in the memory and executable by the processor; a quantum optimizer in communication with the classical computer apparatus, the quantum optimizer comprising: a quantum processor; and a quantum memory; wherein the exposure analysis application is configured for: gathering data associated with at least one user from one or more data sources; processing the data gathered from the one or more data sources, via an artificial intelligence engine, to determine a change to an exposure rating associated with the at least one user; in response to determining the change, converting the data into at least one matrix; converting the at least one matrix to at least one Qubit sequence; transmitting the at least one Qubit sequence to a quantum optimizer; wherein the quantum optimizer is configured for: in response to receiving the at least one Qubit sequence from the exposure analysis application, generating at least one random number based on one or more parameters stored in a configuration repository; computing the at least one Qubit sequence and the at least one random number to generate a real-time exposure rating; and transmitting the real-time exposure rating to exposure analysis application.

In some embodiments, the quantum optimizer is configured for plotting the real-time exposure rating.

In some embodiments, the quantum optimizer is configured for computing the at least one Qubit sequence and the at least one random number based on performing superpositioning the at least one random number onto the at least one Qubit sequence.

In some embodiments, the quantum optimizer is configured for repeating the process of superpositioning 'n' times to improve the accuracy of the real-time exposure rating.

In some embodiments, the exposure analysis application is configured for in response to receiving the exposure rating from the quantum optimizer, approve disbursement of resources based on determining that the real-time exposure rating is above a threshold value.

In some embodiments, the exposure analysis application is configured for in response to receiving the exposure rating from the quantum optimizer, deny disbursement of resources based on the real-time exposure rating is below a threshold value.

In some embodiments, the one or more parameters comprise at least lifetime, historical resource usage, and remuneration of the at least one user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described some embodiments of the present invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

In accordance with embodiments of the invention, the terms "entity" and "third party system" may include any organization that processes financial transactions including, but not limited to, banks, credit unions, savings and loan associations, investment companies, stock brokerages, resource management firms, insurance companies and the like. In accordance with embodiments of the invention, the terms "third party system" and "other third party systems" may include any organizations including, but not limited to, photo identification issuing agencies, network managing organizations, email managing organizations, and/or the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

In accordance with embodiments of the invention, an "account" or a "record" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user datafile that includes information associated with the user, or the like. The account is associated with and/or maintained by the entity. In accordance with embodiments of the present invention, an "encryption" may be a process of encoding information in such a way that only authorized parties can access it.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Many of the embodiments and example embodiments thereof described herein are directed towards solving a problem of computing exposure rating of one or more customers in real-time. Conventional systems do not have the capability to calculate the exposure ratings in real-time and may typically calculate the exposure ratings overnight, thereby rendering the computed exposure rating not efficient. The present invention provides a solution to dynamically calculate the exposure rating in real-time. The system and method described herein use quantum optimizer to quickly adapt to the change in customer data identified in real-time.

Figure 1:
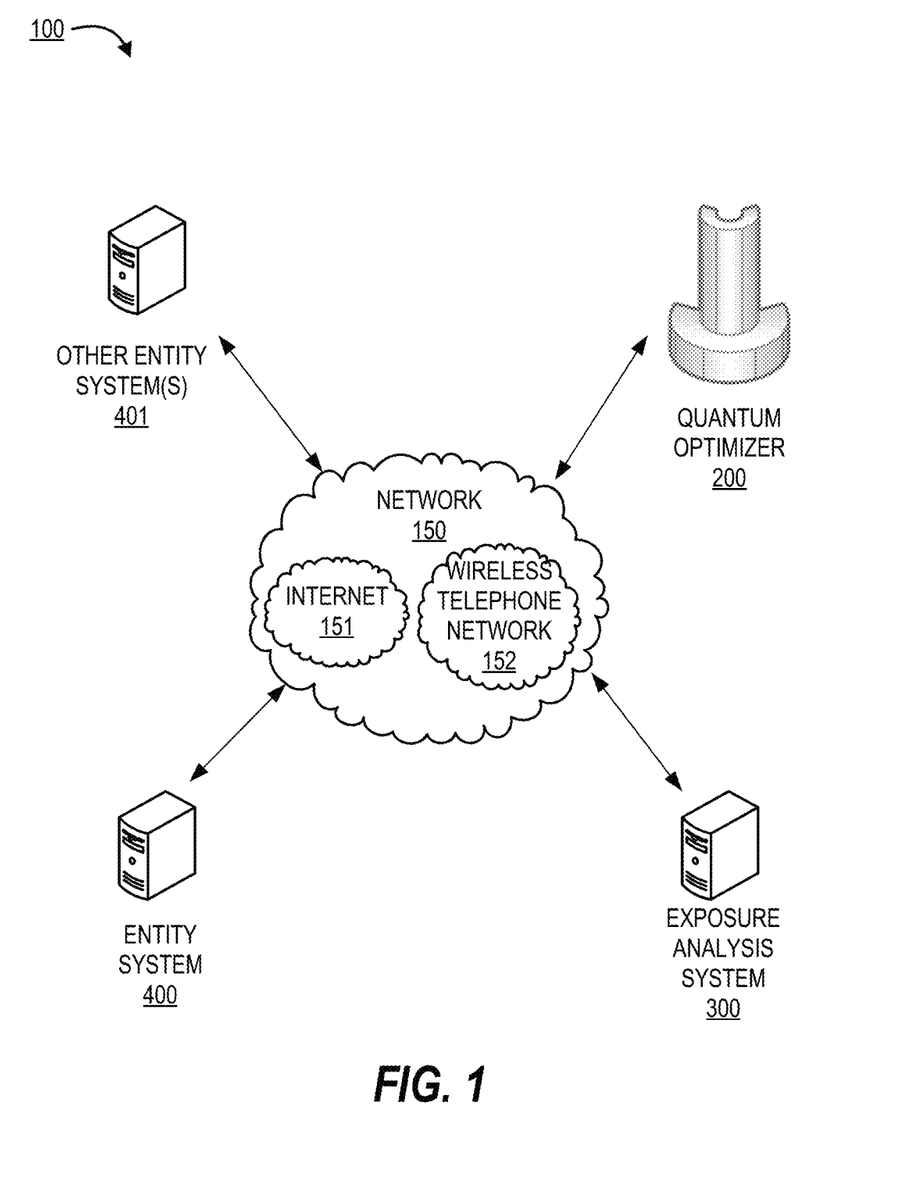
FIG. 1 presents a technical components of a system for generating an enhanced polymorphic quantum enabled firewall, in accordance with an embodiment of the present invention.

FIG. 1 provides a block diagram illustrating an environment 100 for dynamically performing exposure analysis. As depicted in FIG. 1, the operating environment 100 typically includes an exposure analysis system 300 interacting with an entity system 400, a quantum optimizer 200, other entity systems 401, using a network 150. In some embodiments, the exposure analysis system 300 may be maintained by the entity. In some embodiments, the exposure analysis system 300 may be owned by the entity and maintained by a third party. In some embodiments, the exposure analysis system 300 may be a part of the entity system 400. In some embodiments, the system environment may include other third party systems and other entity systems. As further illustrated in FIG. 1, an exemplary quantum optimizer 200 that can be used in parallel with the exposure analysis system 300 to solve optimization problems is presented. In this regard, the exposure analysis system 300 may be used to perform classical digital processing tasks described in the present systems and methods.

The network 150 may be a system specific distributive network receiving and distributing specific network feeds and identifying specific network associated triggers. The network 150 may also be a global area network (GAN), such as Internet 151, a wide area network (WAN), a local area network (LAN), or any other type of network or combination of networks. The network 150 may provide for wireline, wireless, or a combination wireline and wireless communication between devices on the network 150. The network 150 may be a wireless telephone network 152.

Figure 2:
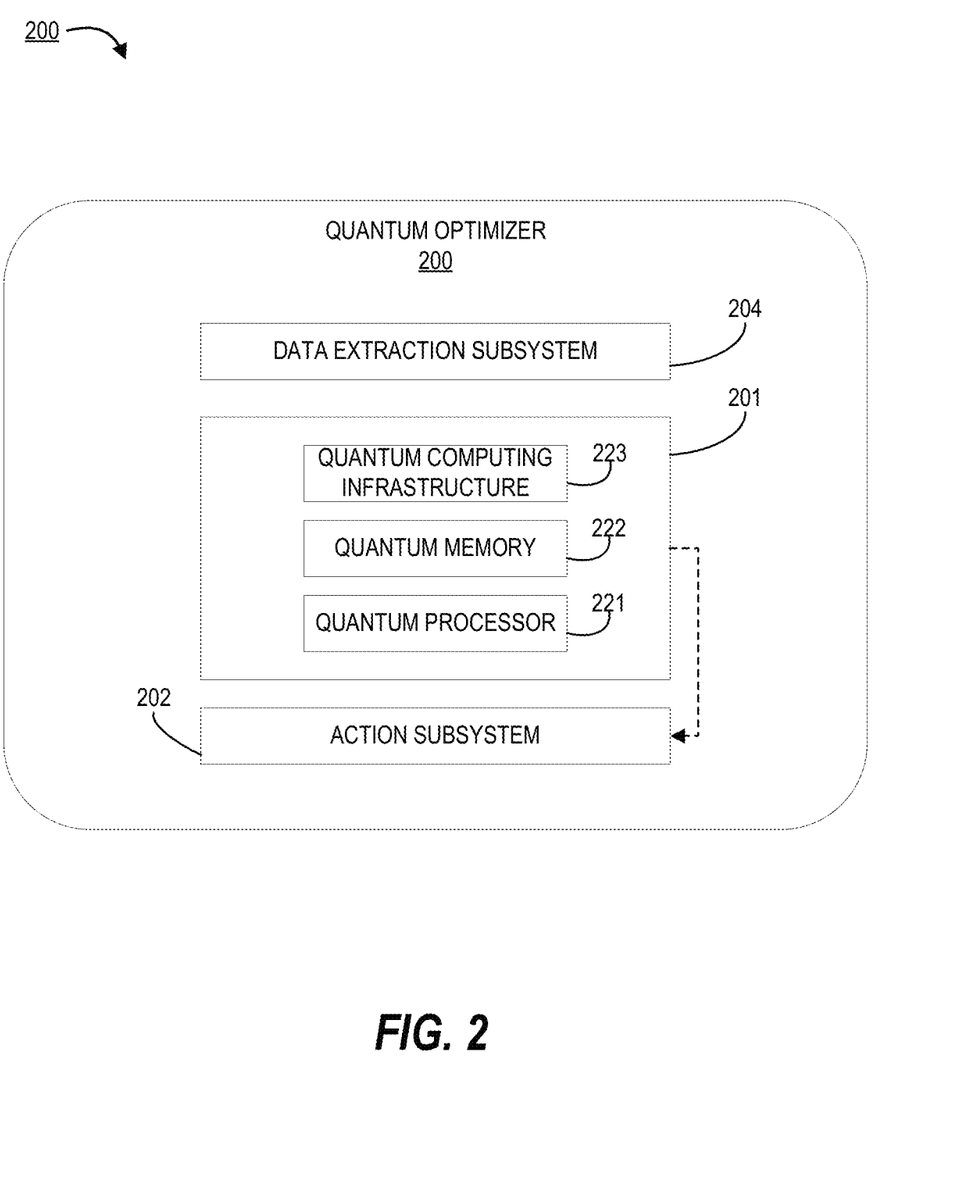
FIG. 2 presents a block diagram illustrating the quantum optimizer of FIG. 1, in accordance with embodiments of the present invention.

FIG. 2 is a schematic diagram of an exemplary Quantum Optimizer 200 that can be used in parallel with a classical computer to solve optimization problems. The Quantum Optimizer 200 is comprised of a Data Extraction Subsystem 204, a Quantum Computing Subsystem 201, and an Action Subsystem 205. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 2, the Data Extraction Subsystem 204 communicates with the exposure analysis system 300 to extract data for optimization. It will be understood that any method of communication between the Data Extraction Subsystem 204 and the network includes, but is not limited to wired communication, Radiofrequency (RF) communication, Bluetooth WiFi, and the like. The Data Extraction Subsystem 204 then formats the data for optimization in the Quantum Computing Subsystem.

As further depicted in FIG. 2, the Quantum Computing Subsystem 201 comprises a Quantum Computing Infrastructure 223, a Quantum Memory 222, and a Quantum Processor 221. The Quantum Computing Infrastructure 223 comprises physical components for housing the Quantum Processor 221 and the Quantum Memory 222. The Quantum Computer Infrastructure 223 further comprises a cryogenic refrigeration system to keep the Quantum Computing Subsystem 201 at the desired operating conditions. In general, the Quantum Processor 221 is designed to perform adiabatic quantum computation and/or quantum annealing to optimize data received from the Data Extraction Subsystem 204. The Quantum Memory 222 is comprised of a plurality of qubits used for storing data during operation of the Quantum Computing Subsystem 201. In general, qubits are any two-state quantum mechanical system. It will be understood that the Quantum Memory 222 may be comprised of any such two-state quantum mechanical system, such as the polarization of a single photon, the spin of an electron, and the like.

The Action Subsystem 202 communicates the optimized data from the Quantum Computing Subsystem 201 back to the exposure analysis system. It will be understood that any method of communication between the Data Extraction Subsystem 204 and the network includes, but is not limited to wired communication, Radiofrequency (RF) communication, Bluetooth WiFi, and the like.

In accordance with the present systems and methods, an on-board quantum optimizer may be employed to perform real-time optimizations to generate strong cryptographic keys more quickly and more reliably than a digital computing system. Because a quantum computing device inherently performs optimization in its natural evolution, quantum optimizer is particularly well-suited to solve optimization problems.

Figure 3:
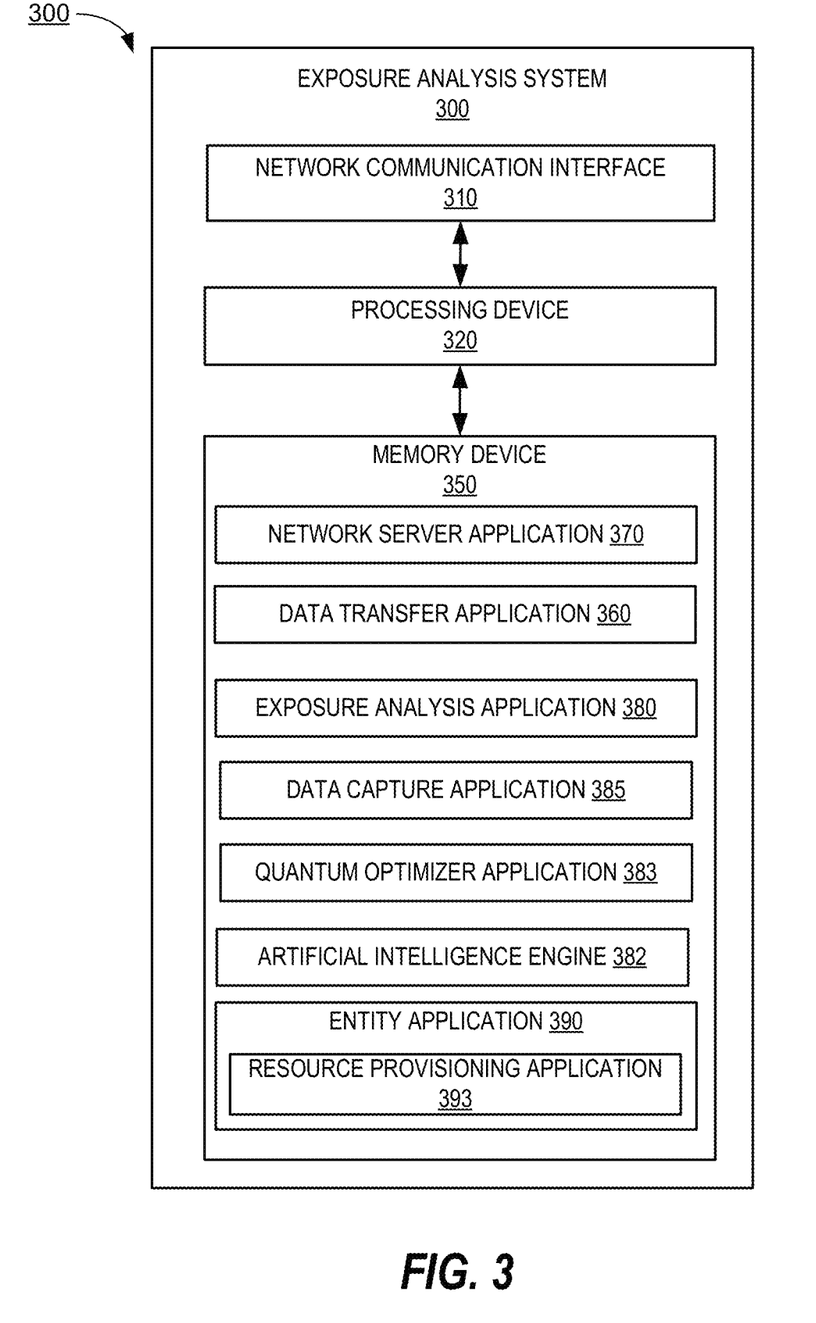
FIG. 3 presents block diagram illustrating the exposure analysis system of FIG. 1, in accordance with embodiments of the present invention.

FIG. 3 presents a block diagram illustrating the exposure analysis system 300, in accordance with embodiments of the invention. The exposure analysis system 300 includes one or more processing devices 320 operatively coupled to a network communication interface 310 and a memory device 350. In certain embodiments, the exposure analysis system 300 is operated by an entity, such as a financial institution. The exposure analysis system 300 is configured to perform classical computer operations described in process flows of the present invention.

It should be understood that the memory device 350 may include one or more databases or other data structures/repositories. The memory device 350 also includes computer-executable program code that instructs the processing device 320 to operate the network communication interface 310 to perform certain communication functions of the exposure analysis system 300 described herein. In one embodiment of the exposure analysis system 300, the memory device 350 includes, but is not limited to, a network server application 370, a data transfer application 360, an exposure analysis application 380, data capture application 385, quantum optimizer application 383, an artificial intelligence engine 381, and an entity application 390 including a resource provisioning application 393, and other computer-executable instructions or other data. The computer-executable program code of the network server application 370, the data transfer application 360, the exposure analysis application 380, data capture application 385, quantum optimizer application 383, artificial intelligence engine 381, entity application 390, or the resource provisioning application 393 may instruct the processing device 320 to perform certain logic, data-processing, and data-storing functions of the exposure analysis system 300 described herein, as well as communication functions of the exposure analysis system 300.

In some embodiments, the quantum optimizer application 383 allows communication with the quantum optimizer 200 using the network communication interface 310. The data capture application 385 allows the capture of data associated with events and other unauthorized attempts discussed in the present invention. The data transfer application 360 facilitates the transfer of the captured data from the exposure analysis system 300 to other systems on the network 150 and from the other system on the network 150 to the exposure analysis system 300. The exposure analysis application 380 is provided by the exposure analysis system 300 for performing steps associated with process flows described in the present invention. The exposure analysis application 380 may include security mechanisms comprising functionalities of intrusion detection, network traffic listening, and/or the like.

As used herein, a "communication interface" generally includes a modem, server, transceiver, and/or other device for communicating with other devices on a network. The network communication interface 310 is a communication interface having one or more communication devices configured to communicate with one or more other devices on the network 150, such the quantum optimizer 200, entity system 400 and other entity systems 401. The processing device 320 is configured to use the network communication interface 310 to transmit and/or receive data and/or commands to and/or from the other devices connected to the network 150.

Figure 4:
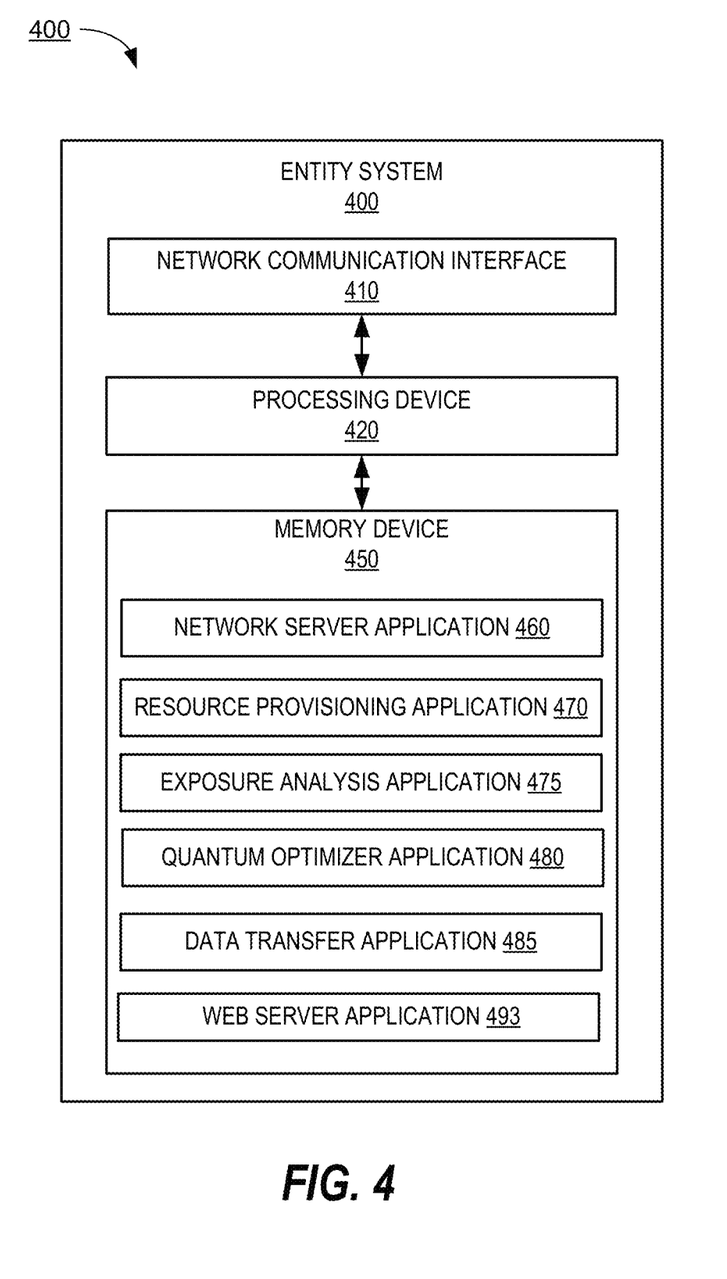
FIG. 4 presents a block diagram illustrating the entity system(s) of FIG. 1, in accordance with embodiments of the present invention.

FIG. 4 provides a block diagram illustrating the entity system 400, in greater detail, in accordance with embodiments of the invention. As illustrated in FIG. 4, in one embodiment of the invention, the entity system 400 includes one or more processing devices 420 operatively coupled to a network communication interface 410 and a memory device 450. In certain embodiments, the entity system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the entity system 400 described herein. In one embodiment of the entity system 400, the memory device 450 includes, but is not limited to, a network server application 460, an authentication application 470, an exposure analysis application 475, a quantum optimizer application 480, a data transfer application 485, and a web server application 493, and other computer-executable instructions or other data. The computer-executable program code of the network server application 460, the authentication application 470, the exposure analysis application 475, the quantum optimizer application 480, the data transfer application 485, or the web server application 493 may instruct the processing device 420 to perform certain logic, data-processing, and data-storing functions of the entity system 400 described herein, as well as communication functions of the entity system 400. The exposure analysis application 475 may be used by the entity system 400 to communicate with the exposure analysis system 300. The data capture application 385 may be used by the exposure analysis system 300 to capture data associated with the process flows described in the present invention.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the exposure analysis system 300, quantum optimizer 200, and/or the other entity systems 401. The processing device 420 is configured to use the network communication interface 410 to transmit and/or receive data and/or commands to and/or from the other devices connected to the network 150.

Figure 5:
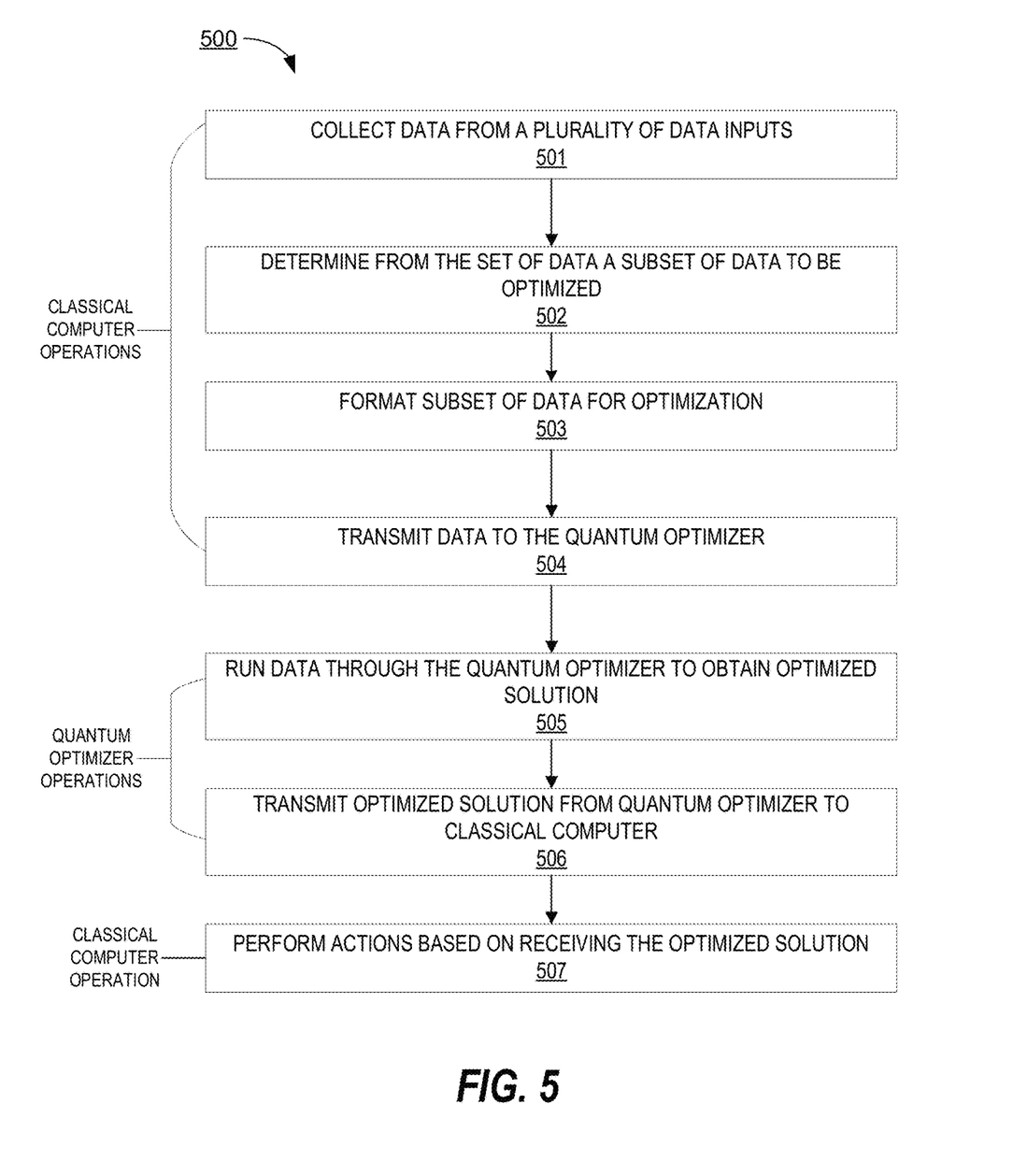
FIG. 5 presents a process flow illustrating the utilization of the quantum optimizer of FIG. 1, in accordance with embodiments of the present invention.

FIG. 5 is a high level process flow of an embodiment of the present invention. FIG. 5 illustrates the interaction between a classical computer and the quantum optimizer 200 to solve an optimization problem. As depicted in FIG. 5, a classical computer begins the process flow 500 at step 501 by collecting data from a plurality of inputs. At step 502, the classical computer then determines from the set of data collected at step 501 a subset a data to be optimized. The classical computer then formats the subset of data for optimization at step 503.

Formatting the subset of data may comprise converting the subset of data into a matrix format and converting the matrix to qubit sequences. At step 504, the classical computer transmits the formatted subset of data to the Quantum Optimizer 200. The Quantum Optimizer 200 runs the data to obtain the optimized solution at 505. The Quantum Optimizer 200 then transmits the optimized data back to the classical computer at step 506. Finally, the classical computer can perform actions based on receiving the optimized solution at step 507.

Figure 6:
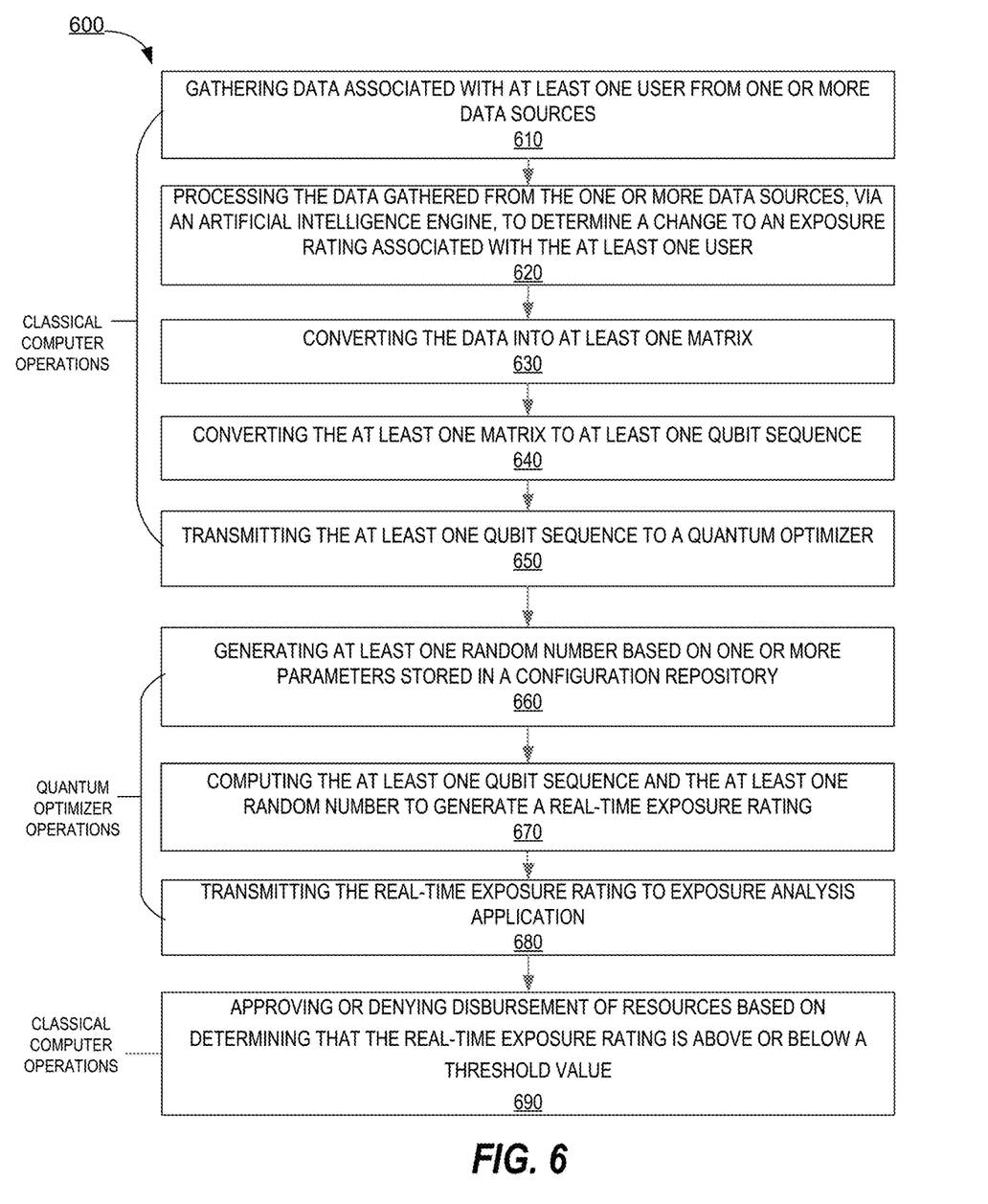
FIG. 6 presents a process flow for dynamically performing exposure analysis, in accordance with embodiments of the present invention.

FIG. 6 presents a process flow for dynamically performing exposure analysis, in accordance with embodiments of the present invention. As shown in block 610, the exposure analysis application of the system, gathering data associated with at least one user from one or more data sources. The at least one user may be a customer of the entity. The one or more data sources may comprise, but are not limited to, auto loan processing application, home loan processing application, credit card processing application, student loan processing application, and customer data. In some embodiments, the one or more data sources comprise historical exposure information stored in a repository.

As shown in block 620, the exposure analysis application of the system processes the data gathered from the one or more data sources, via an artificial intelligence engine, to determine a change to an exposure rating associated with the at least one user. Based on the real-time data gathered from the one or more data sources, the artificial intelligence predicts a change to the exposure rating to the user. For example, if the at least one user has recently applied for an auto loan, the artificial intelligence engine predicts a change to the exposure rating associated with the at least one user. In another example, the system may identify a change to the remuneration of the at least one user and may predict a change to the exposure rating of the at least one user.

As shown in block 630, the exposure analysis application of the system converts the data into at least one matrix. The system comprises a matrix builder which converts the sourced data extracted from the one or more data sources into a matrix format, where the matrix comprises information associated with customer data (e.g., lifetime, remuneration, or the like), loan data (e.g., student loan, auto loan, etc.), or the like.

As shown in block 640, the exposure analysis application of the system converts the at least one matrix to at least one Qubit sequence. The matrix generated by the matrix builder is passed onto a Qubit converter of the system, where the Qubit converter converts the at least one matrix into at least one Qubit sequence, where the Qubit sequence is a basic unit of quantum information processed by the quantum optimizer. As shown in block 650, the exposure analysis application of the system in response to generating the at least one Qubit sequence, transmits the at least one Qubit sequence to a quantum optimizer.

As shown in block 660, the quantum optimizer generates at least one random number based on one or more parameters stored in a configuration repository. The at least one random number generated by the quantum optimizer is based on a combination of the one or more parameters which comprise at least lifetime, historical resource usage, and remuneration of the at least one user.

As shown in block 670, the quantum optimizer computes the at least one Qubit sequence and the at least one random number to generate a real-time exposure rating. Computing the at least one Qubit sequence and the at least one random number comprises superpositioning the at least one random number onto the at least one Qubit sequence. The process of superpositioning is repeated 'n' times by the quantum optimizer until the real-time exposure rating is accurate. In some embodiments, the system plots the real-time exposure rating dynamically in real-time. In some embodiments, the system may determine a change to the exposure rating and automatically transforms a user interface provided by the system to display the updated exposure rating. As shown in block 680, the quantum optimizer transmits the real-time exposure rating to exposure analysis application.

Figure 7:
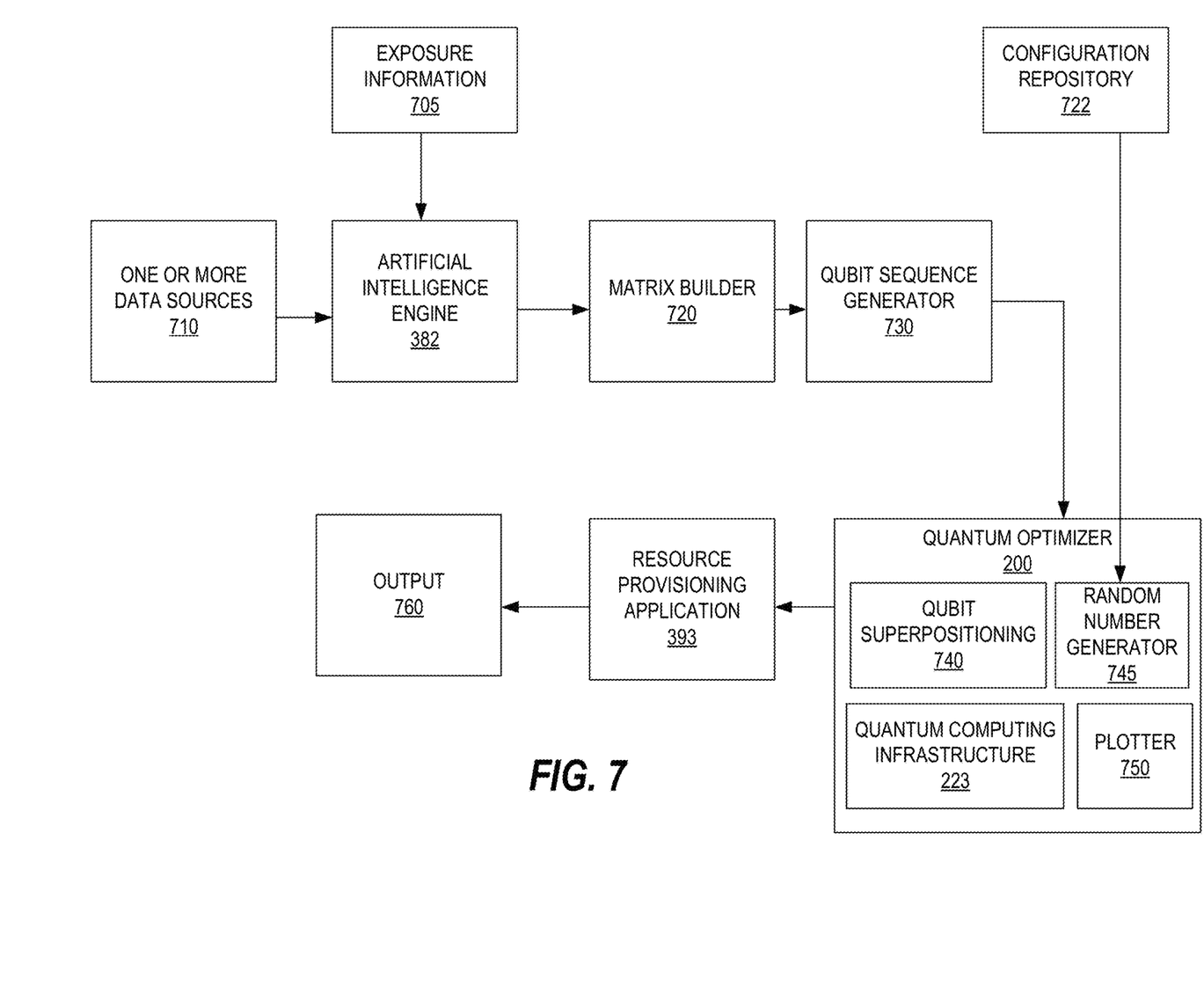
FIG. 7 presents a block diagram illustrating the process of dynamically performing exposure analysis, in accordance with embodiments of the present invention.

As shown in block 690, the exposure analysis application of the system approves or denies disbursement of resources based on determining that the real-time exposure rating is above or below a threshold value. In one embodiment, in response to receiving the real-time exposure rating from the quantum optimizer, the system may determine that the real-time exposure rating is above a threshold value and may approve disbursement of resources (e.g., new personal loan, or the like). In another embodiment, in response to receiving the real-time exposure rating from the quantum optimizer, the system may determine that the real-time exposure rating is below a threshold value and may deny disbursement of resources FIG. 7 presents a block diagram illustrating the process of dynamically performing exposure analysis, in accordance with embodiments of the present invention. As shown, the system may extract real-time information by connecting to one or more data sources 710. In some embodiments, the one or more data sources 710 may be entity data sources. In some embodiments, the one or more data source 710 may be third party data sources. In some embodiments, the one or more data sources 710 may be a combination of entity data sources and third party data sources. As shown the system may extract historical exposure information 705 from a repository and the artificial intelligence engine 382 of the system predicts a change to the exposure rating of the user based on the historical exposure information and the data extracted from the one or more data sources. In response to predicting a change, the matrix builder 720 of the system converts the extracted data and the historical exposure information into a matrix format and passes on the matrix to the Qubit sequence generator 730 of the system. The Qubit sequence generator converts the matrix into at least one Qubit sequence and transmits the at least one Qubit sequence to the quantum optimizer 200. A random number generator of the quantum optimizer 200 generates a random number based on one or more parameters extracted from a configuration repository 722, where the configuration repository may be a part of the entity system 400 or the exposure analysis system 300. The Qubit Superpositioning module 740 of the quantum optimizer 200 superpositions the random number onto the Qubit sequence and the quantum computing infrastructure computes the random number and Qubit sequence to generate a real-time exposure rating. The plotter 750 plots the real-time exposure rating generated by the system, where an employee of the entity may look at the plot via a graphical user interface provided by the system of the present invention. The real-time exposure rating generated by the system is real-time and real-time decisioning about the approval of disbursement of resources is generated by the system in a short amount of time (e.g., a few seconds/minutes), thereby improving the efficiency of the process and reducing the real-time exposure of the entity.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer system for performing dynamic exposure analysis based on quantum simulations, comprising:
    a classical computer apparatus comprising:
        a processor;
        a memory; and
        an exposure analysis application that is stored in the memory and executable by the processor;
    a quantum optimizer in communication with the classical computer apparatus, the quantum optimizer comprising:
    a quantum processor; and
    a quantum memory;
    wherein the exposure analysis application is configured for:
        gathering real-time data associated with at least one user from one or more data sources, wherein the real-time data comprises customer personal data and the one or more data sources comprises historical exposure data and resource applications;
        processing the real-time data gathered from the one or more data sources, via an artificial intelligence engine, to predict a change to an exposure rating associated with the at least one user based on the customer personal data;
        in response to determining the change, converting the real-time data and historical exposure data into at least one matrix, via a matrix builder, wherein the matrix comprises the customer personal data and resource applications;
        converting the at least one matrix to at least one Qubit sequence;
        transmitting the at least one Qubit sequence to a quantum optimizer;
    wherein the quantum optimizer is configured for:
        in response to receiving the at least one Qubit sequence from the exposure analysis application, generating at least one random number based on one or more parameters stored in a configuration repository;
        computing the at least one Qubit sequence and the at least one random number to generate a real-time exposure rating based on performing superpositioning of the at least one random number onto the at least one Qubit sequence, wherein the real-time exposure rating comprises real-time decisioning;
        transforming a user interface to display the real-time exposure rating;
        repeating process of superpositioning 'n' times to improve accuracy of the real-time exposure rating;
        transmitting the real-time exposure rating to the exposure analysis application; and
        in response to receiving the real-time exposure rating from the quantum optimizer the exposure analysis application is configured for approving disbursement of resources based on determining that the real-time exposure rating is above a threshold value.

2. The computer system of claim 1, wherein the quantum optimizer is configured for plotting the real-time exposure rating.

3. The system of claim 2, wherein the exposure analysis application is configured for in response to plotting the real-time exposure rating, displaying real-time exposure rating plot on a graphical user interface to an entity user of an entity.

4. The system of claim 3, wherein the entity is associated with the at least one user, wherein the at least one user is a customer of the entity.

5. The system of claim 3, wherein the one or more data sources are entity data sources associated with the entity.

6. The computer system of claim 1, wherein the exposure analysis application is configured for:
    in response to receiving the exposure rating from the quantum optimizer, deny disbursement of resources based on the real-time exposure rating is below the threshold value.

7. The computer system of claim 1, wherein the one or more parameters comprise at least lifetime, historical resource usage, and remuneration of the at least one user.

8. A computer program product for performing dynamic exposure analysis based on quantum simulations, comprising a non-transitory computer-readable storage medium having computer-executable instructions for causing a classical computer apparatus comprising to:

gather real-time data associated with at least one user from one or more data sources, wherein the real-time data comprises customer personal data and the one or more data sources comprises historical exposure data and resource applications;

process the real-time data gathered from the one or more data sources, via an artificial intelligence engine, to predict a change to an exposure rating associated with the at least one user based on the customer personal data;

in response to determining the change, convert the real-time data and historical exposure data into at least one matrix, via a matrix builder, wherein the matrix comprises the customer personal data and resource applications;

convert the at least one matrix to at least one Qubit sequence;

transmit the at least one Qubit sequence to a quantum optimizer;

wherein the quantum optimizer is configured for:

in response to receiving the at least one Qubit sequence from an exposure analysis application stored on the classical computer apparatus, generating at least one random number based on one or more parameters stored in a configuration repository;

computing the at least one Qubit sequence and the at least one random number to generate a real-time exposure rating based on performing superpositioning of the at least one random number onto the at least one Qubit sequence, wherein the real-time exposure rating comprises real-time decisioning;

transforming a user interface to display the real-time exposure rating;

repeating process of superpositioning 'n' times to improve accuracy of the real-time exposure rating;

transmitting the real-time exposure rating to the exposure analysis application; and in response to receiving the real-time exposure rating from the quantum optimizer the exposure analysis application is configured for approving disbursement of resources based on determining that the real-time exposure rating is above a threshold value.

9. The computer program product of claim 8, wherein the quantum optimizer is configured for plotting the real-time exposure rating.

10. The computer program product of claim 8, wherein the computer executable instructions cause the classical computer apparatus to in response to receiving the exposure rating from the quantum optimizer, deny disbursement of resources based on the real-time exposure rating is below the threshold value.

11. The computer program product of claim 8, wherein computer executable instructions cause the classical computer apparatus to in response to plotting the real-time exposure rating, displaying real-time exposure rating plot on a graphical user interface to an entity user of an entity.

12. The computer program product of claim 11, wherein the entity is associated with the at least one user, wherein the at least one user is a customer of the entity.

13. The computer program product of claim 11, wherein the one or more data sources are entity data sources associated with the entity.

14. A method for performing dynamic exposure analysis based on quantum simulations, comprising:

gathering, via a classical computer apparatus, real-time data associated with at least one user from one or more data sources, wherein the real-time data comprises customer personal data and the one or more data sources comprises historical exposure data and resource applications;

processing, via a classical computer apparatus, the real-time data gathered from the one or more data sources, via an artificial intelligence engine, to predict a change to an exposure rating associated with the at least one user based on the customer personal data;

in response to determining the change, converting, via a classical computer apparatus, the real-time data and historical exposure data into at least one matrix, via a matrix builder wherein the matrix comprises the customer personal data and resource applications;

converting, via a classical computer apparatus, the at least one matrix to at least one Qubit sequence;

transmitting, via a classical computer apparatus, the at least one Qubit sequence to a quantum optimizer;

in response to receiving the at least one Qubit sequence from an exposure analysis application stored on the classical computer apparatus, generating, via a quantum optimizer, at least one random number based on one or more parameters stored in a configuration repository;

computing, via the quantum optimizer, the at least one Qubit sequence and the at least one random number to generate a real-time exposure rating based on performing superpositioning of the at least one random number onto the at least one Qubit sequence, wherein the real-time exposure rating comprises real-time decisioning;

transforming a user interface to display the real-time exposure rating;

repeating process of superpositioning 'n' times to improve accuracy of the real-time exposure rating;

transmitting, via the quantum optimizer, the real-time exposure rating to the exposure analysis application; and in response to receiving the real-time exposure rating from the quantum optimizer the exposure analysis application is configured for approving disbursement of resources based on determining that the real-time exposure rating is above a threshold value.

15. The method of claim 14, wherein the method further comprises plotting, via the quantum optimizer, the real-time exposure rating.

16. The method of claim 15, wherein the method comprises in response to plotting the real-time exposure rating, displaying, via a classical computer apparatus, real-time exposure rating plot on a graphical user interface to an entity user of an entity.

17. The method of claim 16, wherein the entity is associated with the at least one user, wherein the at least one user is a customer of the entity.

18. The method of claim 16, wherein the one or more data sources are entity data sources associated with the entity.

19. The method of claim 8, wherein the method further comprises in response to receiving the exposure rating from the quantum optimizer, deny, via the classical computer apparatus, disbursement of resources based on the real-time exposure rating is below the threshold value.

20. The method of claim 14, wherein the one or more parameters comprise at least lifetime, historical resource usage, and remuneration of the at least one user.

* * * * *